United States Patent
Yoshida

(10) Patent No.: US 9,104,354 B2
(45) Date of Patent: Aug. 11, 2015

(54) INFORMATION PROCESSING APPARATUS, CONTROL METHOD, AND STORAGE MEDIUM SETTING FILTER INFORMATION FOR PERMITTING COMMUNICATION WITH ANOTHER INFORMATION PROCESSING APPARATUS

(71) Applicant: CANON KABUSHIKI KAISHA, Tokyo (JP)

(72) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/279,054

(22) Filed: May 15, 2014

(65) Prior Publication Data

US 2014/0340709 A1    Nov. 20, 2014

(30) Foreign Application Priority Data

May 17, 2013    (JP) .................................. 2013-104794

(51) Int. Cl.
*G06F 3/12*    (2006.01)

(52) U.S. Cl.
CPC .................................... *G06F 3/1231* (2013.01)

(58) Field of Classification Search
None
See application file for complete search history.

(56) References Cited

U.S. PATENT DOCUMENTS 7,880,914 B2 *    2/2011    Tanji ............................ 358/1.15

FOREIGN PATENT DOCUMENTS

JP    2010-108169 A    5/2010

* cited by examiner

*Primary Examiner* — Paul F Payer
(74) *Attorney, Agent, or Firm* — Canon U.S.A., Inc. IP Division

(57) ABSTRACT

When a rotation instruction is issued to replace MFP A by MFP B to be used, a management application of the MFP A obtains and stores network information of the MFP B, and exchanges setting value data of the MFP A with that of the MFP B. Further, if the network information of the MFP A is included in the exchanged setting value data, the management application of the MFP A changes the exchanged setting value data using the stored network information of the MFP B.

7 Claims, 15 Drawing Sheets

FIG.7

```
...
<export_data type="rotation">
...
<network>
  <setting>
    <v4_address>192.168.0.10</v4_address>
...
  </setting>
  <filter>
    <MAC_accept_list count="2">
      <address>34-12-56-78-90-AB</address>
      <address>56-78-90-AB-12-34</address>
    </MAC_accept_list>
...
  </filter>
...
</network>
...
```

FIG.14

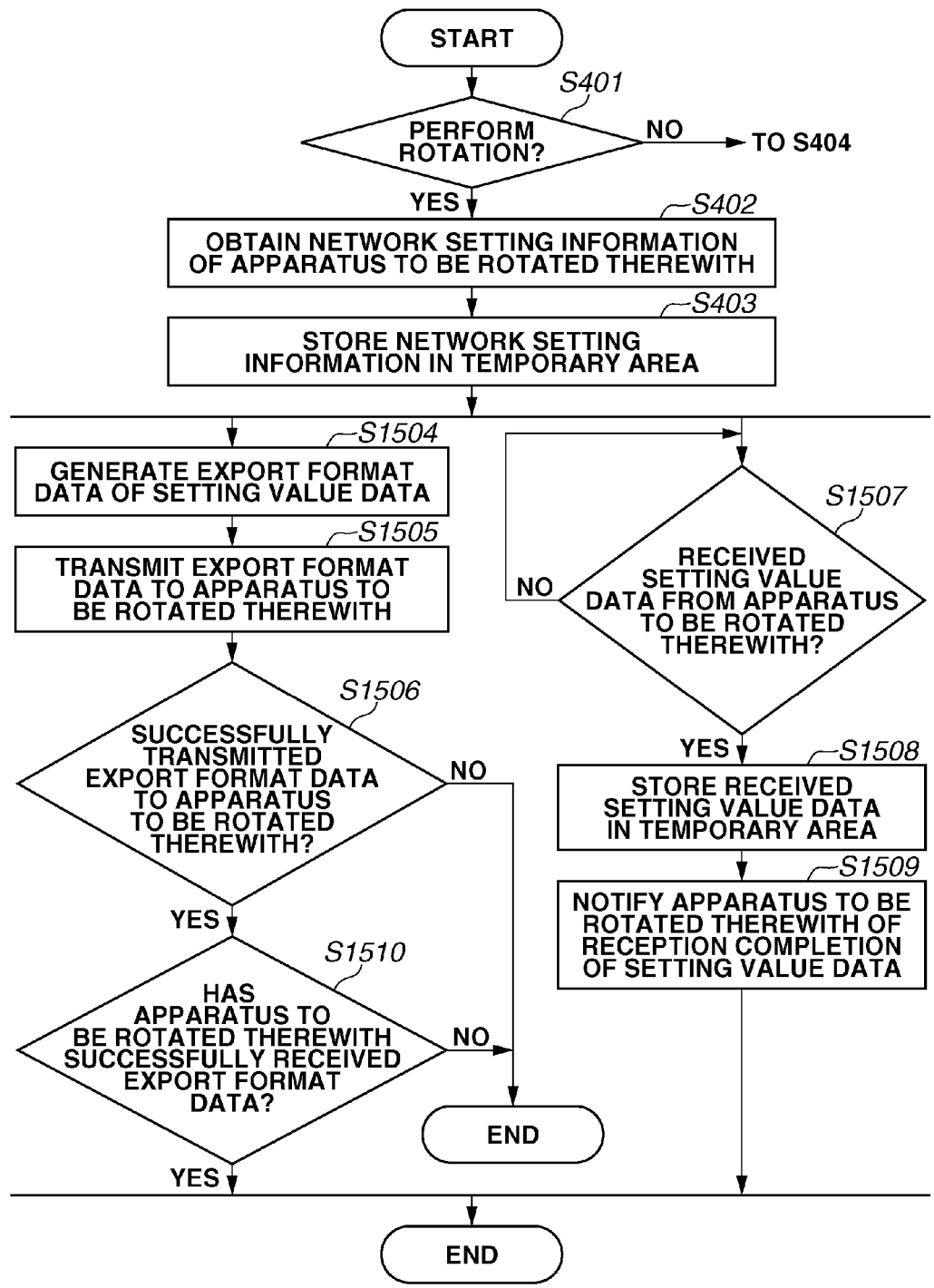

INFORMATION PROCESSING APPARATUS, CONTROL METHOD, AND STORAGE MEDIUM SETTING FILTER INFORMATION FOR PERMITTING COMMUNICATION WITH ANOTHER INFORMATION PROCESSING APPARATUS

BACKGROUND OF THE INVENTION

1. Field of the Invention

The present invention relates to performing, in a case where information processing apparatuses are rotated and used, setting control of setting value data.

2. Description of the Related Art

When an information processing apparatus such as a multifunction peripheral (MFP) is replaced by a new apparatus, it becomes necessary for the new apparatus to inherit setting values of the information processing apparatus and the setting values of applications, i.e., the setting value data. For example, a technique for distributing the setting values for realizing inheritance of the setting value data is widely known. More specifically, the apparatus is connected to a network or memory medium, and the setting value data of the information processing apparatus is then obtained or distributed.

On the other hand, when the information processing apparatus is replaced by a new apparatus, it also becomes necessary to change network settings with respect to the apparatuses which communicate with the information processing apparatus, in addition to the setting value data of the apparatus. For example, Japanese Patent Application Laid-Open No. 2010-108169 discusses a technique in which, when a terminal is replaced, the setting a network device which communicates with the terminal is automatically changed via a management server. Such a setting of the network device has filter setting information including a media access control (MAC) address.

However, the technique discussed in Japanese Patent Application Laid-Open No. 2010-108169 assumes that the information processing apparatus is replaced by a new apparatus. If the information processing apparatus which has previously been in use is rotated and used, there are cases where the new apparatus cannot correctly inherit the setting value data. For example, it is assumed that two information processing apparatuses, in which the MAC address of the other apparatus is respectively set in MAC address filter information of each apparatus, are rotated and reinstalled. In such a case, if the new apparatus simply inherits the setting value data, the rotated information processing apparatuses cannot communicate with each other.

Further, a conventional technique which resets the MAC address filter information via a third party such as the management server does not consider changing the MAC address filter information of a plurality of devices at the same time. As a result, it is difficult to change the setting values in which the new information and the old information cross over, in consistency with each other.

SUMMARY OF THE INVENTION

According to an aspect of the present invention, if information processing apparatuses in a network are rotated and used, the setting value data between the information processing apparatuses can be exchanged in consistency with each other.

According to another aspect of the present invention, a first information processing apparatus includes an obtaining unit configured to obtain setting information of another information processing apparatus, a changing unit configured to change, in the case where the obtained setting information includes an address of the first information processing apparatus, the address of the first information processing apparatus included in the obtained setting information to an address of the another information processing apparatus, and a setting unit configured to set setting information changed by the changing unit as a setting of the first information processing apparatus.

Further features of the present invention will become apparent from the following description of exemplary embodiments with reference to the attached drawings.

BRIEF DESCRIPTION OF THE DRAWINGS

FIG. 7 illustrates an example of exported setting value data.

FIG. 14 illustrates an example of an operation screen for instructing rotation.

FIG. 15 is a flowchart illustrating an example of processing for exchanging the setting value data according to a third exemplary embodiment of the present invention.

DESCRIPTION OF THE EMBODIMENTS

Various exemplary embodiments, features, and aspects of the invention will be described in detail below with reference to the drawings. A digital MFP (hereinafter referred to as an MFP) which is used as an image forming apparatus will be described below as an example of the information processing apparatus to be rotated. However, the information processing apparatus according to the present invention is not limited to the image forming apparatus.

Figure 1:
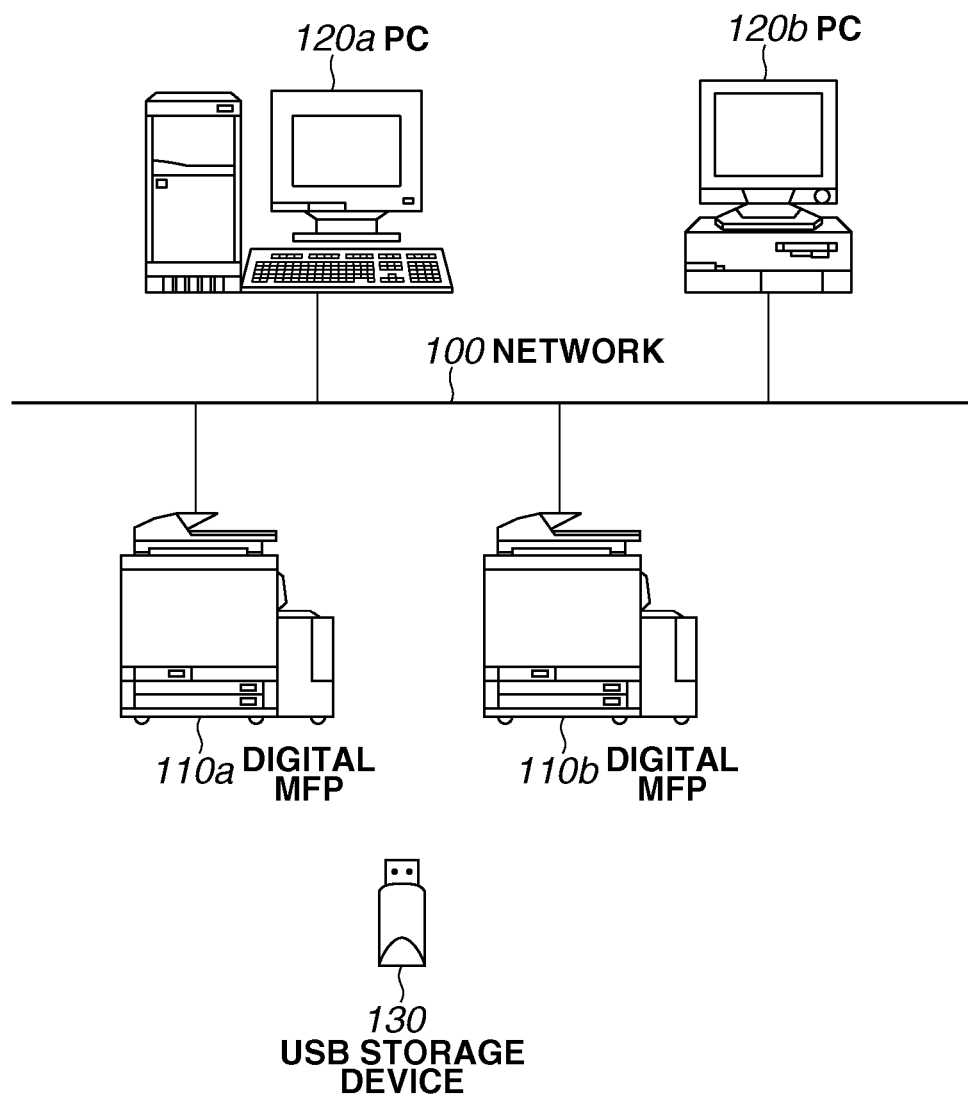
FIG. 1 illustrates an example of a configuration of a system including an information processing apparatus according to a first exemplary embodiment of the present invention.

FIG. 1 illustrates an example of a system in an environment where the MFP is used, i.e., the information processing apparatus according to a first exemplary embodiment of the present invention.

Referring to FIG. 1, according to the present exemplary embodiment, the system includes an MFP 110a, an MFP 110b, a personal computer (PC) 120a, and a PC 120b, which are communicable and perform various processes by communicating via a network 100. Hereinafter, the MFP 110a and the MFP 110b are collectively referred to as the MFP 110.

For example, client computers such as the PC 120a and the PC 120b transmit page description language (PDL) data to the MFP 110 via the network 100, and the MFP 110 performs output. Further, the MFP 110a (or the MFP 110b) reads a document, performs image processing, and generates image data. The MFP 110a (MFP 110b) then transmits the generated image data to the MFP 110b (MFP 110a) via the network 100, and the MFP 110b (MFP 110a) stores the image data in a storage device therein.

The MFP 110 thus includes various network functions, such as a MAC address filter function or an Internet protocol (IP) address filter function, for communicating via the network 100.

Further, the MFP 110 is capable of exporting the setting value data therein to a universal serial bus (USB) storage device 130 (i.e., a USB memory) by performing predetermined operations. Furthermore, the MFP 110 is capable of importing the setting value data stored in the USB storage device 130. According to the present exemplary embodiment, the USB storage device will be described as an example. However, other storage devices may be used. For example, other detachably-attachable storage device such as an SD card may be used, or a storage area of the PC connected via the network may be used.

Hardware and software configurations of the MFP 110 will be described below with reference to FIGS. 2 and 3. Since the configurations of the MFP 110a and the MFP 110b are similar, the configurations will be described below as the configurations of the MFP 110.

Figure 2:
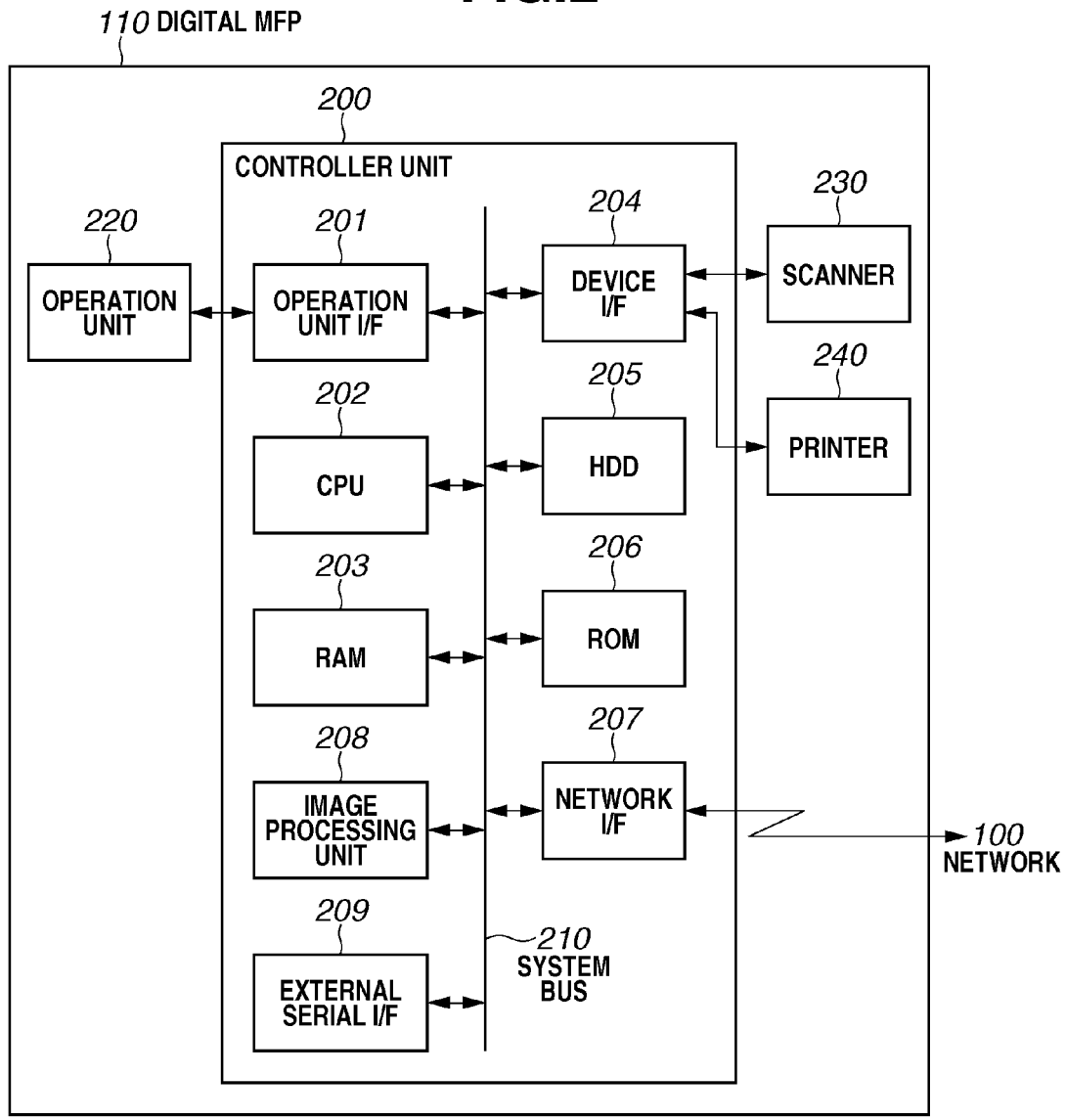
FIG. 2 is a block diagram illustrating an example of a hardware configuration of an MFP.

FIG. 2 is a block diagram illustrating an example of a hardware configuration of the MFP 110.

Referring to FIG. 2, the MFP 110 includes a controller unit 200, an operation unit 220, a scanner 230, and a printer 240. The controller unit 200 is connected to the operation unit 220, the scanner 230, i.e., an image input device, and the printer 240, i.e., an image output device.

More specifically, the controller unit 200 includes a central processing unit (CPU) 202. The CPU 202 activates an operating system (OS) using a boot program stored in a read-only memory (ROM) 206. The controller unit 200 then executes application programs stored in a hard disk drive (HDD) 205 on the OS, and performs various processes. The CPU 202 uses a random access memory (RAM) 203 as a work area.

The ROM 206, such as a flash ROM, stores the programs executed by the CPU 202 and the setting value data to be rewritable. The RAM 203 provides the work area and an image memory area for temporarily storing the image data. The HDD 205 stores the application programs and the image data. Other storage device such as a solid state drive (SSD) may be used instead of the HDD 205.

The CPU 202 is connected via a system bus 210 to an operation unit interface (I/F) 201, a device I/F 204, a network I/F 207, an image processing unit 208, and an external serial I/F 209, in addition to the ROM 206 and the RAM 203.

The operation unit I/F 201 is an interface to the operation unit 220 which includes a touch panel. The operation unit I/F 201 outputs the image data to be displayed on the operation unit 220 to the operation unit 220. Further, the operation unit I/F 201 obtains information input by a user on the operation unit 220 from the operation unit 220 and transmits the obtained information to the CPU 202.

The device I/F 204 is connected to the scanner 230 and the printer 240, and performs synchronous/asynchronous conversion of the image data. The network I/F 207 is connected to the network 100, and inputs and outputs the information between each of the apparatuses on the network 100.

The image processing unit 208 performs processing of the image input from the scanner 230, output image processing with respect to the printer 240, image rotation, image compression, resolution conversion, color space conversion, and gradation conversion. The external serial I/F 209 is the interface to the USB storage device 130, and performs bi-directional data exchange with connected external devices.

Figure 3:
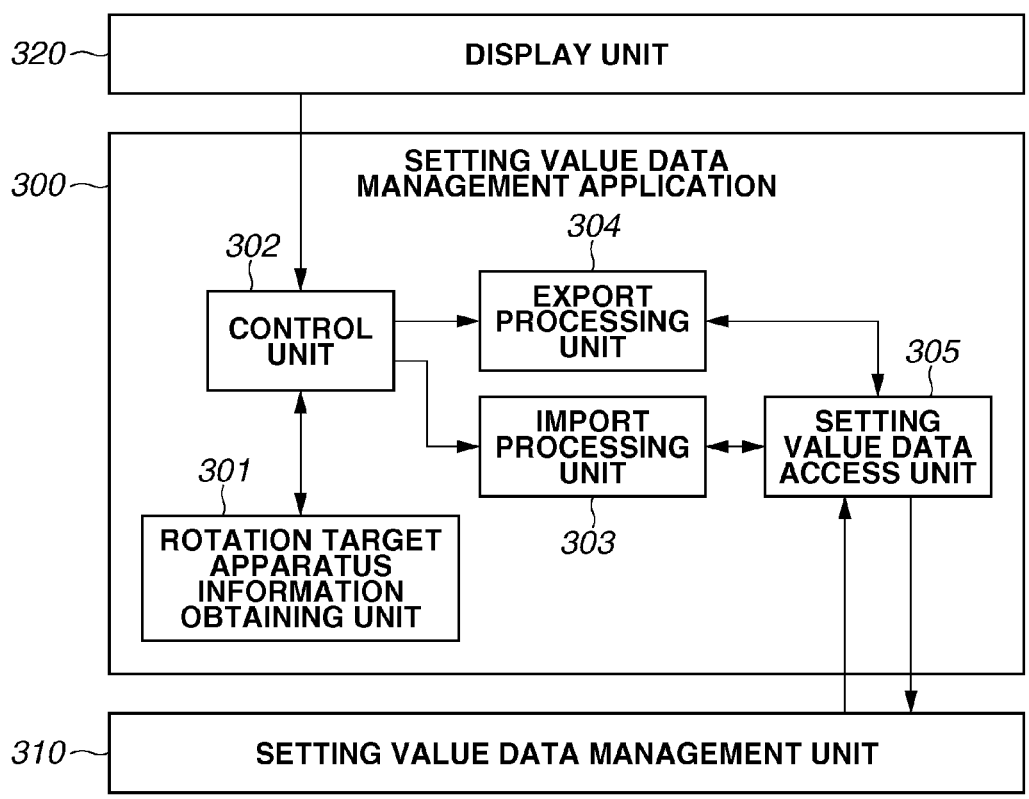
FIG. 3 is a block diagram illustrating an example of a management application which runs on the MFP.

FIG. 3 is a block diagram illustrating an application program for managing the setting value data, which runs on the MFP 110.

Referring to FIG. 3, a display unit 320 controls displaying of an operation screen on a display of the operation unit 220 and receiving of an operation from an operator on the touch panel or hard keys of the operation unit 220.

A setting value data management application (hereinafter referred to as a management application) 300 receives a processing request from the display unit 320 and performs exporting and importing of the setting value data according to the request. A control unit 302 controls the entire management application 300.

An export processing unit 304 and an import processing unit 303 respectively perform exporting and importing of the setting value data according to an instruction from the control unit 302. More specifically, the export processing unit 304 and the import processing unit 303 respectively request a setting value data management unit 310 via a setting value data access unit 305 to read and write the setting value data, and thus perform export processing and import processing. The setting value data management unit 310 stores the setting value data in the ROM 206 or the HDD 205 and manages the setting value data. In other words, when the import processing is performed, the setting value data is imported to the ROM 206 or the HDD 205.

Further, when the export processing is performed, the export processing unit 304 reads the setting value data from the setting value data management unit 310 via the setting value data access unit 305, and generates the setting value data for exporting. The control unit 302 then writes the setting value data, which has been generated for exporting, in the USB storage device 130 connected to the external serial I/F 209. The import processing unit 303 writes the read setting value data in the setting value data management unit 310 via the setting value data access unit 305.

When one of the MFPs 110 is to be rotated with the other MFP 110, a rotation target apparatus information obtaining unit 301 obtains information (e.g., network setting information including the MAC address) on the MFP 110 to be rotated therewith, and stores the information in the RAM 203 or the HDD 205.

The management application 300, the setting value data management unit 310, and the display unit 320 correspond to the functions realized by the MFP 110 by the CPU 202 executing a program stored in one of the RAM 203, the HDD 205, and the ROM 206. In other words, the processes performed by each of the modules, i.e., the rotation target apparatus information obtaining unit 301, the control unit 302, the export processing unit 303, the import processing unit 304, and the setting value data access unit 305, in the management application 300, the setting value data management unit 310, and the display unit 320 are realized by control based on the program executed by the CPU 202.

Processing for generating, when the user instructs rotation of the MFP 110, the setting value data to be transmitted to the device to be rotated therewith will be described below.

Figure 4:
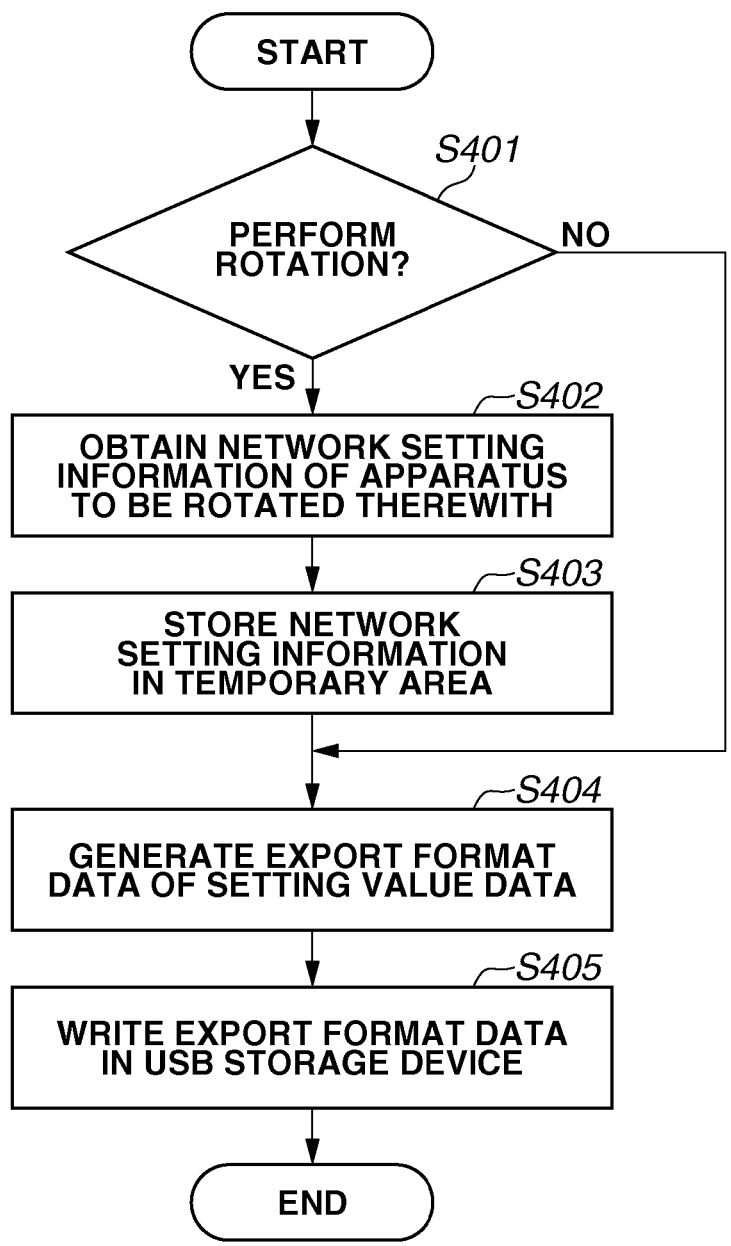
FIG. 4 is a flowchart illustrating an example of export processing performed according to the first exemplary embodiment.

FIG. 4 is a flowchart illustrating the export processing performed according to the first exemplary embodiment. The processing corresponds to processing of the management application 300 executed by the CPU 202 when the user instructs rotation of the MFP 110, for generating setting value data to be transferred to the device to be rotated therewith. In other words, the MFP 110 realizes the processing illustrated in FIG. 4 by the CPU 202 executing the program including the management application 300 stored in the ROM 206 or the HDD 205. S401 through S405 illustrated in FIG. 4 indicate each step of the processing.

Figure 5:
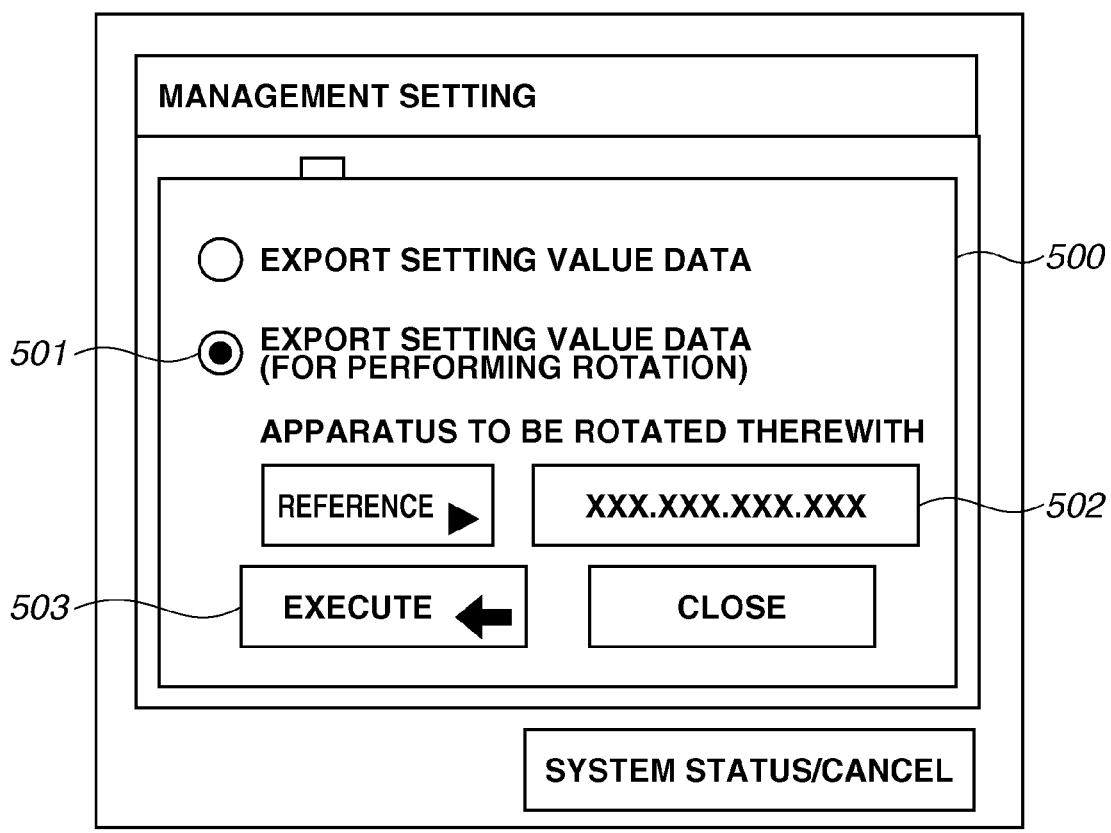
FIG. 5 illustrates an example of an operation screen for instructing exporting.

FIG. 5 illustrates an example of an operation screen 500 for instructing exporting, which is displayed on the operation unit 220.

Referring to FIG. 5, the operation screen 500 includes items 501 for selecting whether to normally perform exporting of the setting value data or perform exporting of the setting value data for performing rotation. Further, the operation screen 500 includes a box 502 for inputting the information on the device to be rotated therewith, and a button 503 for instructing execution.

When rotation is to be performed, the user selects "export setting value data (for performing rotation)" among the items 501, and inputs the information for identifying the apparatus to be rotated therewith, such as the IP address or a domain name system (DNS) name, to the box 502. If the user then presses the execution button 503, the instruction for exporting the setting value data for performing rotation and the information for identifying the apparatus to be rotated therewith, which has been input to the box 502, are input from the display unit 320 to the management application 300. On the other hand, if the setting value data is to be normally exported, the user selects "export setting value data" among the items 501, and presses the execution button 503. A normal export instruction is then input from the display unit 320 to the management application 300.

The processing illustrated in the flowchart of FIG. 4 will be described below. Upon receiving an instruction from the display unit 320, the control unit 302 in the management application 300 starts the processing illustrated in FIG. 4. In step S401, the control unit 302 determines whether the received instruction is an instruction to perform rotation. If the instruction for performing rotation has been received from the display unit 320, the control unit 302 determines that rotation is to be performed (YES in step S401), and the processing proceeds to step S402.

In step S402, the control unit 302 obtains the information on the apparatus to be rotated therewith, which has been input to the box 502, from the display unit 320.

In step S403, the rotation target apparatus information obtaining unit 301 transmits via the network I/F 207 a network setting information obtaining request to the MFP 110 to be rotated therewith, based on the information obtained in step S402. Upon receiving the network setting information of the MFP 110 to be rotated therewith as a response to the transmitted network setting information obtaining request, the rotation target apparatus information obtaining unit 301 stores the received information in a temporary area of the HDD 205. The processing then proceeds to step S404. The network setting information includes the MAC address.

If the control unit 302 has received an instruction for normally exporting the setting value data from the display unit 320, the control unit 302 determines that rotation is not to be performed (NO in step S401). The processing then proceeds to step S404 without performing the processes of step S402 and step S403.

In step S404, the control unit 302 instructs the export processing unit 304 to generate export format data of the setting value data. In such a case, the control unit 302 also instructs the export processing unit 304 to generate the export format data for performing rotation or to generate normal export format data. Upon receiving such export instruction, the export processing unit 304 requests the setting value data access unit 305 to obtain the setting value data. The setting value data access unit 305 then reads the requested setting value data from the setting value data management unit 310 and returns the read data to the export processing unit 304. The export processing unit 304 converts the setting value data obtained via the setting value data access unit 305 to the instructed export format data, and generates the export format data. In such a case, "<export_data type>" is written in the data according to the instructed export format. For example, if the data is for performing rotation, "<export_data type="rotation">" is written in the data.

In step S405, the control unit 302 obtains the export format data generated by the export processing unit in step S404. The control unit 302 then writes via the external serial I/F 209 the obtained export format data in the USB storage device 130 connected to the MFP 110. Upon completing writing the data in the USB storage device 130, the control unit 302 transmits a notification that the processing has been completed to the display unit 320, and the processing of the flowchart illustrated in FIG. 4 ends.

Figure 6:
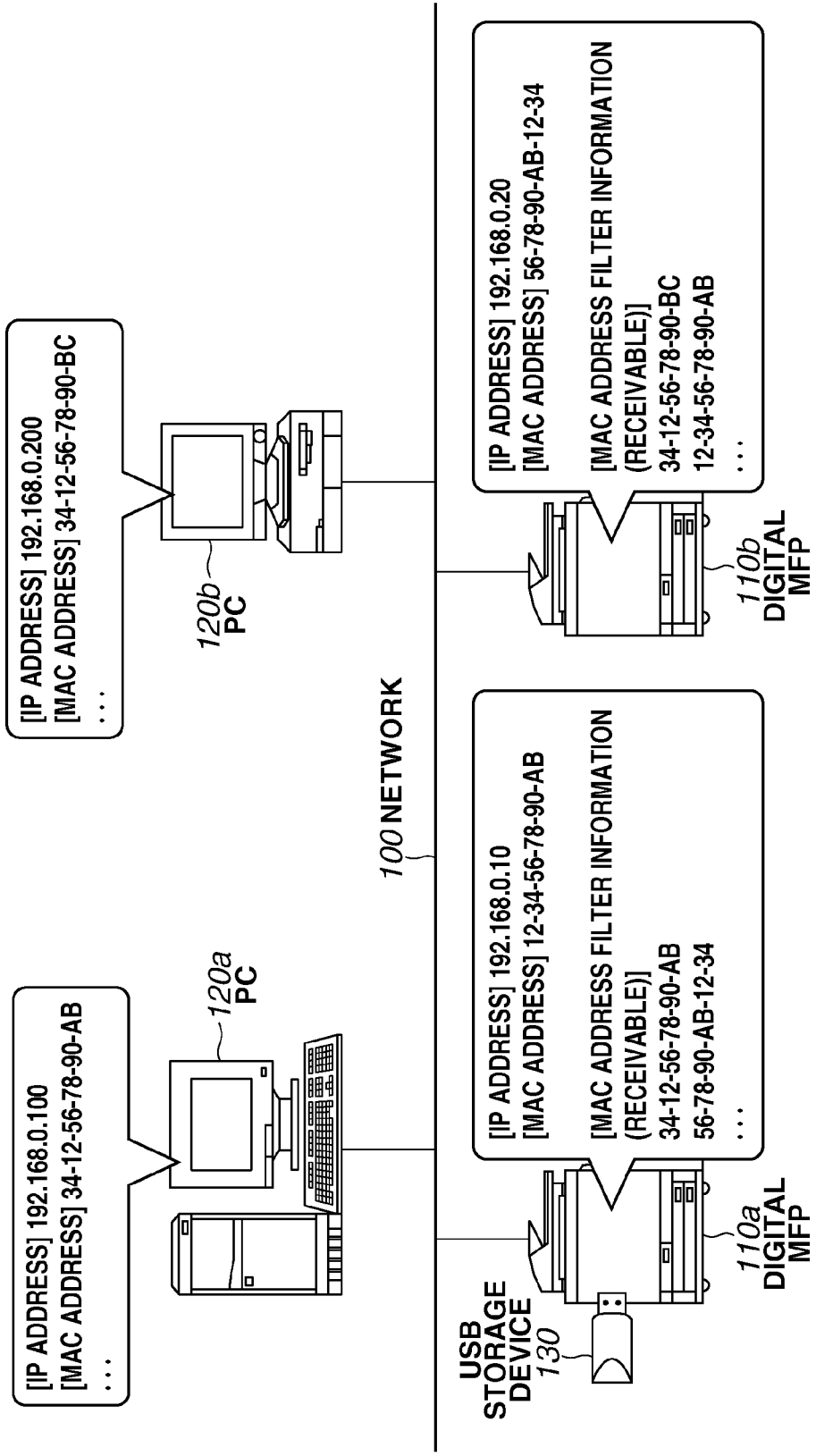
FIG. 6 illustrates an example of the system configuration before performing rotation.

FIG. 6 illustrates an example of the system configuration before performing rotation.

Further, FIG. 7 illustrates an example of the exported setting value data.

More specifically, FIG. 7 illustrates an example of the data generated, when the network setting is as illustrated in FIG. 6, the USB storage device 130 is connected to the MFP 110a, and generation processing of the setting value data for rotation is performed as illustrated in FIG. 4. It is assumed that the MFP 110b is designated as the apparatus to be rotated therewith.

In a setting environment as illustrated in FIG. 6, filter information based on the MAC address is respectively set for the MFP 110a and 110b, so that the devices communicable with the MFP are restricted. More specifically, the MAC address filter information for receiving the requests from the PC 120a and the MFP 110b are set for the MFP 110a. Further, the MAC address filter information for receiving the requests from the PC 120b and the MFP 110a are set for the MFP 110b.

If the MFP 110a designates the MFP 110b and executes exporting of the setting value data for rotation, the following is performed. In step S402 and step S403 illustrated in FIG. 4, the rotation target apparatus information obtaining unit 301 obtains and stores the network setting information of the MFP 110b. For example, the rotation target apparatus information obtaining unit 301 obtains the MAC address information of the MFP 110b as the network setting information. The export data in which the information of the MFP 110a is as illustrated in FIG. 7 is thus generated.

Further, the MFP 110b similarly exports the setting value data. Furthermore, the setting value data exported from the MFP 110a is imported to the MFP 110b, and the setting value data exported from the MFP 110b is imported to the MFP 110a as will be described below.

Processing for importing the setting value data, which has been exported by instructing rotation of the MFP 110, to a rotation partner and for setting the setting value data will be described below.

Figure 8:
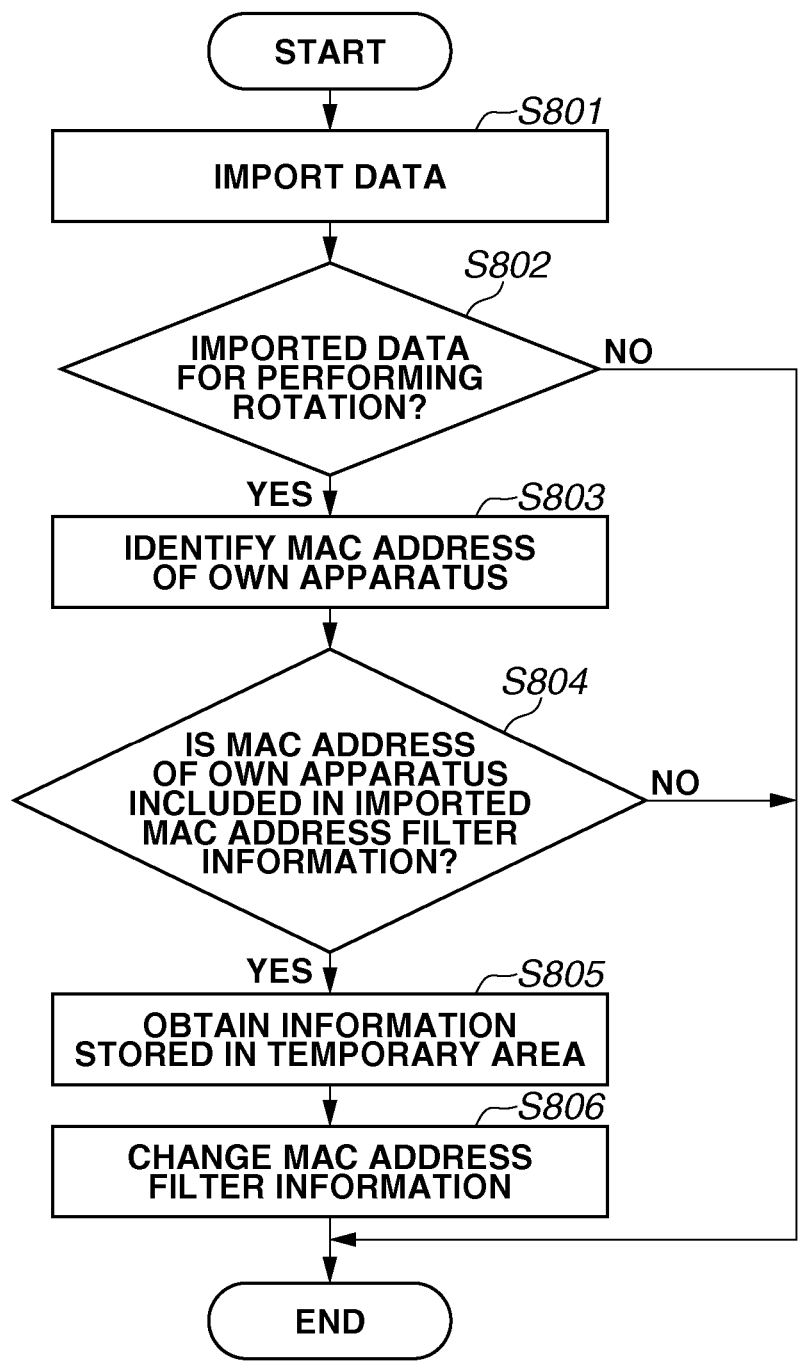
FIG. 8 is a flowchart illustrating an example of import processing performed according to the first exemplary embodiment.

FIG. 8 is a flowchart illustrating an example of the import processing performed according to the first exemplary embodiment. The processing illustrated in FIG. 8 corresponds to processing of the management application 300 executed by the CPU 202 for importing the setting value data exported according to an instruction to rotate the MFP 110 and setting the setting value data to the MFP 110. In other words, the MFP 110 realizes the processing illustrated in FIG. 8 by the CPU 202 in the MFP 110 executing the program including the management application 300 stored in the ROM 206 or the HDD 205. S801 through S806 illustrated in FIG. 8 indicate each step of the processing.

Upon detecting the USB storage device 130, the control unit 302 in the management application 300 checks whether predetermined data exists in the USB storage device 130. If the control unit 302 determines that the predetermined data exists in the USB storage device 130, the control unit 302 starts the import processing illustrated in FIG. 8.

In step S801, the control unit 302 reads the setting value data from the USB storage device 130 via the external serial I/F 209, and instructs the import processing unit 303 to perform the import processing. Upon receiving the instruction to perform the import processing, the import processing unit 303 checks validation of the data, analyzes the data, and identifies the data to be set for the setting value data management unit 310. The import processing unit 303 then requests the setting value data access unit 305 to set the identified data. The setting value data access unit 305 transmits a data write request to the setting value data management unit 310, and the setting value data management unit 310 stores the setting value data in one or more of the RAM 203, the HDD 205, and the ROM 206. Upon completing the import processing, the import processing unit 303 returns a result to the control unit 302. If the control unit 302 receives the result of the import processing, the processing proceeds to step S802.

In step S802, the control unit 302 determines whether the import processing is for processing the data for performing rotation, based on the result of the import processing received from the import processing unit 303. The control unit 302 determines based on the content of "<export_data type>" written in the setting value data read from the USB storage device 130. In the example illustrated in FIG. 7, "<export_data type="rotation">" is written in the setting value data, so that the control unit 302 determines the data is for performing rotation.

If the control unit 302 determines that the import processing is not for processing the data for performing rotation (NO in step S802), the control unit 302 transmits the information indicating that the import processing has been completed to the display unit 320, and the processing ends. Further, if the control unit 302 determines that the import processing has failed (not illustrated), the control unit 302 transmits the information indicating that the import processing has failed to the display unit 320, and the processing ends.

On the other hand, if the control unit 302 determines that the import processing is for processing the data for performing rotation (YES in step S802), the processing proceeds to step S803. In step S803, the control unit 302 identifies the MAC address information of the own apparatus.

In step S804, the control unit 302 instructs the import processing unit 303 to confirm whether the MAC address of the own apparatus identified in step S803 exists in the MAC address filter information imported in step S801. More specifically, the import processing unit 303 issues a request to obtain the MAC address filter information to the setting value data management unit 310 via the setting value data access unit 305, and obtains the MAC address filter information. Further, the import processing unit 303 determines whether the MAC address of the own apparatus is included in the MAC address filter information, and returns the determination result to the control unit 302.

If the determination result indicates that the MAC address of the own apparatus is not included in the MAC address filter information (NO in step S804), the control unit 302 transmits an import processing completion notification to the display unit 320. The processing then ends.

If the determination result indicates that the MAC address of the own apparatus is included in the MAC address filter information (YES in step S804), the processing proceeds to step S805.

In step S805, the control unit 302 requests the rotation target apparatus information obtaining unit 301 to obtain the information stored in the temporary area in step S403 of the flowchart illustrated in FIG. 4 (i.e., the network setting information of the MFP 110 to be rotated therewith). The rotation target apparatus information obtaining unit 301 reads the information stored in the HDD 205 and returns the read information to the control unit 302.

In step S806, the control unit 302 obtains the MAC address information of the apparatus to be rotated therewith from the information obtained in step S805 (i.e., the network setting information of the MFP 110 to be rotated therewith). The control unit 302 then requests the import processing unit 303 to delete the MAC address of the own apparatus from the MAC address filter information, and newly set the obtained MAC address information of the apparatus to be rotated therewith to the MAC address filter information. The import processing unit 303 instructs the setting value data management unit 310 via the setting value data access unit 305 to change the MAC address filter information, and returns the result of rewriting the MAC address filter information to the control unit 302. The control unit 302 then confirms that the MAC address filter information has been changed, transmits the import processing completion notification to the display unit 320, and ends the processing.

Figure 9:
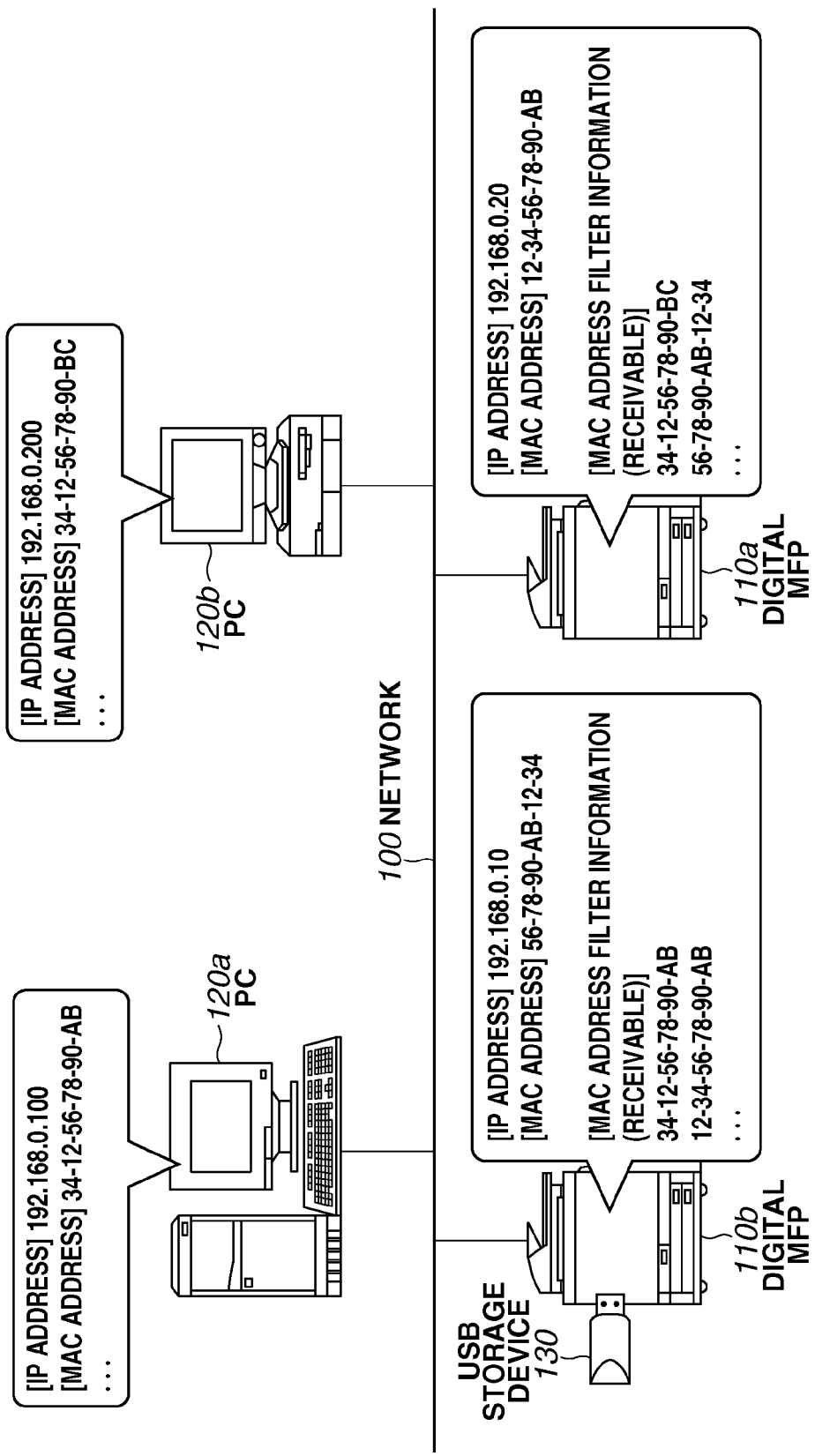
FIG. 9 illustrates an example of the system configuration after performing rotation.

FIG. 9 illustrates an example of the system configuration after performing rotation. More specifically, FIG. 9 corresponds to the network setting after the MFP 110a and the MFP 110b are rotated, and the setting value data of the MFP 110a and 110b are respectively imported to the MFP 110b and 110a.

In step S801 of the flowchart illustrated in FIG. 8, the management application 300 running on the MFP 110b reads the setting data of the export format generated in the MFP 110a and written in the USB storage device 130, and performs the import processing. The MAC address filter information of the MFP 110b immediately after performing the import processing is "34-12-56-78-90-AB" and "56-78-90-AB-12-34". If the processing then ends as in the conventional technique, the MFP 110b is set so that the request from the MFP 110a cannot be received. Therefore, according to the present exemplary embodiment, the processes of step S803 to step S806 of the flowchart illustrated in FIG. 8 are performed.

More specifically, in step S803, the control unit 302 identifies that the MAC address of the own apparatus is "56-78-90-AB-12-34". In step S804, the control unit 302 determines that the same MAC address exists in the MAC address filter information. In step S805, the control unit 302 obtains the MAC address "12-34-56-78-90-AB" which is the previously obtained network setting information of the MFP 110a. In step S806, the control unit 302 adds "12-34-56-78-90-AB" to and deletes "56-78-90-AB-12-34" from the MAC address filter information. The processing then ends. Further, the import processing of the setting value data for performing rotation is similarly performed in the MFP 110a.

By performing the above-described processing, the MAC address filter information of the MFP 110b after completion of the processing is set to "34-12-56-78-90-AB" and "12-34-56-78-90-AB". Further, the MAC address filter information of the MFP 110a is set to "34-12-56-78-90-BC" and "56-78-90-AB-12-34". As a result, the MFP 110b is set to be capable of receiving the request from the PC 120a and the MFP 110a, and the MFP 110a is set to be capable of receiving the request from the PC 120b and the MFP 110b after performing rotation.

As described above, if the MFP 110a and the MFP 110b are rotated and the setting value data are exchanged, the MAC address filter information of a similar condition as the MAC address filter information set before performing rotation can be automatically set. It is thus unnecessary for an administrator to manually change the setting of the MAC address filter information.

According to the present exemplary embodiment, the MAC address filter information has been described as an example. However, the technique according to the present invention is not limited to the MAC address filter information. For example, if the information processing apparatuses are to be rotated, network filtering information can be automatically set by performing similar processing when exchanging the setting value data including the network filtering information other than the MAC address filter information. More specifically, IP address filter information can be automatically set by performing similar processing on the IP address filter information in the environment where the IP address is a unique value for each MFP. The environment where the IP address is a unique value for each MFP is an environment where the IP address is determined from the MAC address.

As described above, when a plurality of MFP is rotated, the network filtering information of a similar condition as the information set before performing rotation can be automatically set. It is thus unnecessary for the administrator to manually change the setting of the network filtering information. The network filtering information corresponds, for example, to the MAC address information or the IP address filter information.

A second exemplary embodiment of the present invention to be described below is different from the above-described first exemplary embodiment in the following points. According to the second exemplary embodiment, the setting value data of the MFP is managed in a server. Further, the server exports and imports the setting value data. The differences from the first exemplary embodiment will be mainly described below.

Figure 10:
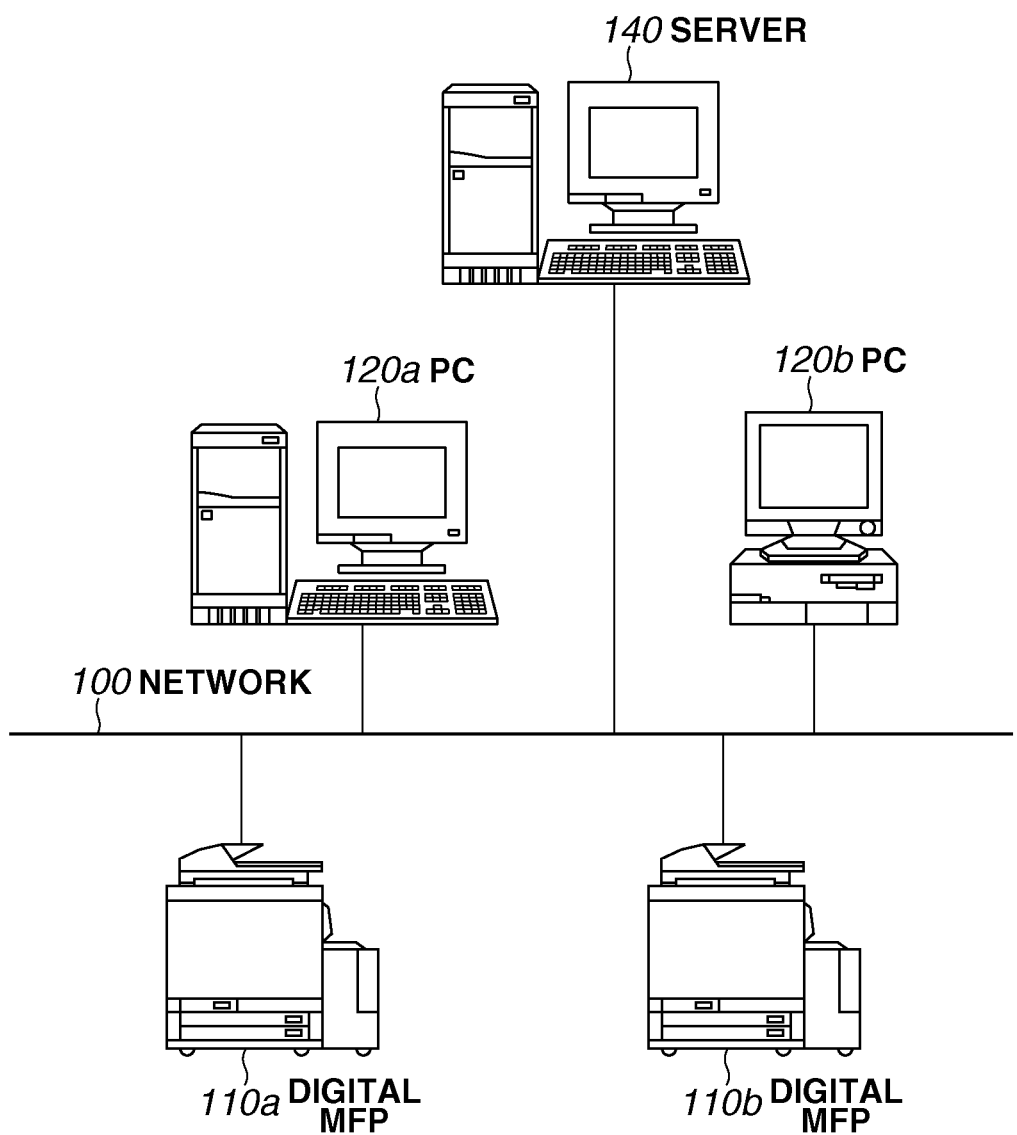
FIG. 10 illustrates an example of the configuration of a system including the information processing apparatus according to a second exemplary embodiment of the present invention.

FIG. 10 illustrates an example of the configuration of the entire system in the environment where the MFP is used, i.e., the information processing apparatus according to the second exemplary embodiment of the present invention.

Referring to FIG. 10, according to the present exemplary embodiment, a server 140 manages the setting value data of the MFP 110a and the MFP 110b in the system. The MFP 110 obtains the setting value data from the server 140 and operates.

Figure 11:
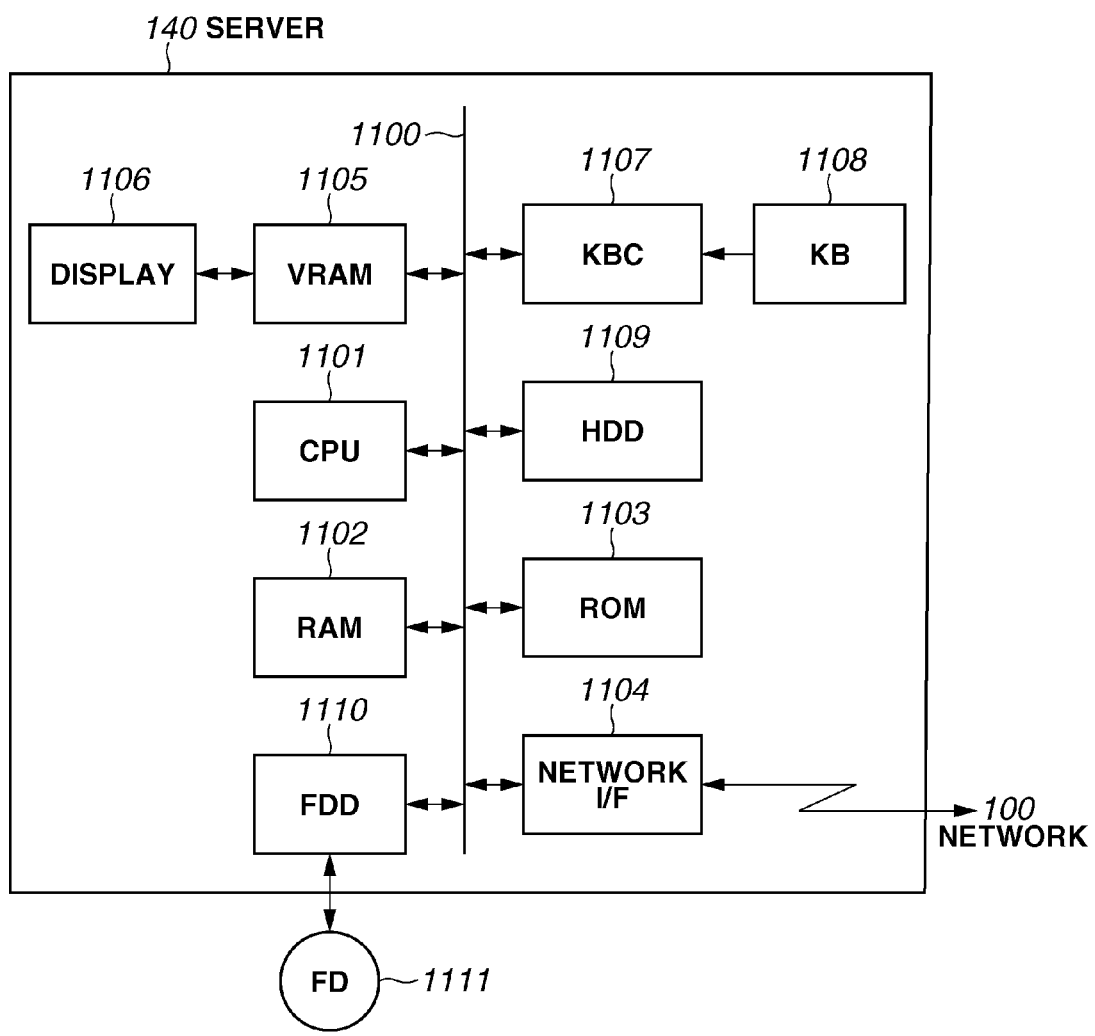
FIG. 11 is a block diagram illustrating an example of a hardware configuration of a server.

FIG. 11 is a block diagram illustrating an example of a hardware configuration of the server 140.

Referring to FIG. 11, a CPU 1101 performs control and calculations of the server 140. A RAM 1102 is a main memory of the CPU 1101 and functions as an area of an executed program, an execution area of the program, and a data area. A ROM 1103 stores operation processing procedures of the CPU 1101. The ROM 1103 includes a program ROM in which basic software (operating system (OS)), i.e., a system program for performing device control of the server 140, is recorded, and a data ROM in which the information necessary for activating the system is recorded. An HDD 1109 to be described below may be used in place of the ROM 1103.

A network I/F 1104 transmits and receives data to and from the MFP via the network 100. A video RAM (VRAM) 1105 expands an image to be displayed on the screen of a display 1106, and performs display control of the display 1106. A controller (KBC) 1107 controls an input signal from an external input device (keyboard (KB)) 1108 for receiving a user operation. The external input device 1108 may be a keyboard or a pointing device such as a mouse.

The HDD 1109 stores application programs and various data. According to the present exemplary embodiment, the application programs are the software programs for implementing various processing units. Other storage devices such as the SSD may be used instead of the HDD 1109.

An external input/output device (i.e., a floppy disk drive (FDD)) 1110 such as a Floppy® disk drive and a digital versatile disk (DVD)-ROM drive inputs and outputs a removable disk. The external input/output device 1110 is used for reading the above-described application programs from a medium. A floppy disk (FD) 1111 is a removable data recording device (medium) read by the FDD 1110. For example, the FD 1111 may be a magnetic recording medium (e.g., the Floppy® disk or an external HD), an optic recording medium (e.g., a DVD-ROM), a magneto-optic recording medium (MO), or a semiconductor recording medium (e.g., a memory card). The application programs and the data stored in the HDD 1109 may be stored in the FD 1110 and used. A transmission bus 1100 (i.e., an address bus, a data bus, an input/output bus, and a control bus) is for connecting the above-described units.

Figure 12:
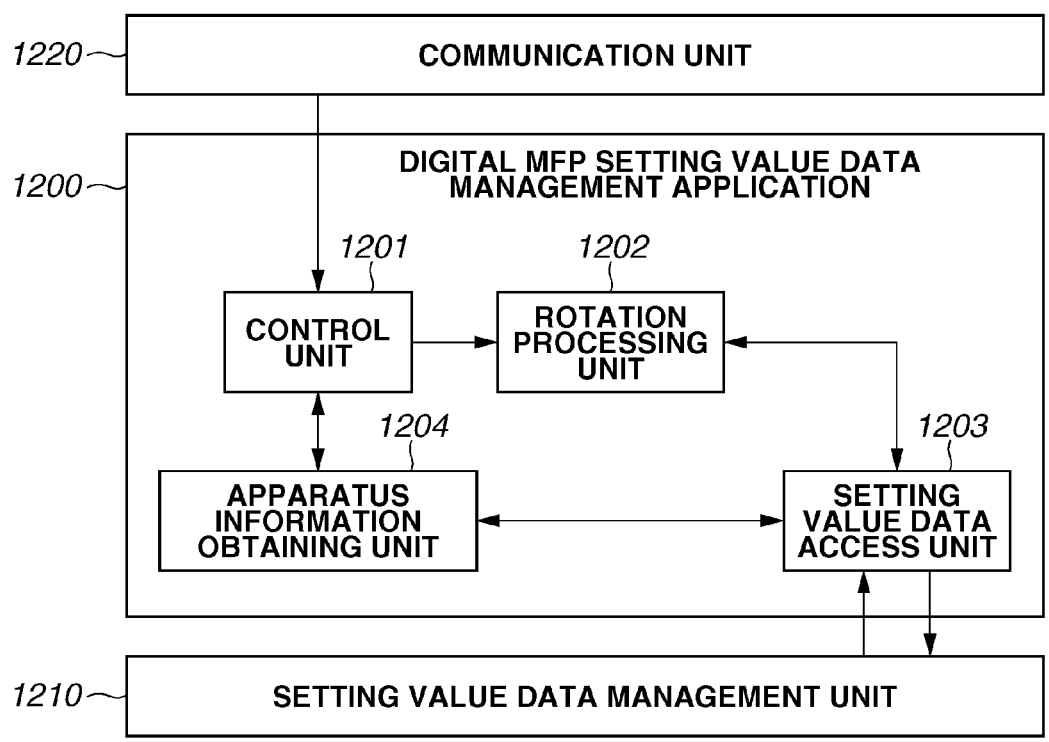
FIG. 12 is a block diagram illustrating an example of a management application which runs on the server.

FIG. 12 is a block diagram illustrating an MFP management application program which runs on the server 140.

Referring to FIG. 12, a communication unit 1220 controls communication with the MFP 110 via the network 100. An MFP management application (hereinafter referred to as a management application) 1200 receives a processing request from the communication unit 1220, and obtains/changes the setting value data or performs rotation processing of the setting value data according to the request. A control unit 1201 controls the entire management application 1200.

The setting value data is rotated by a rotation processing unit 1202 issuing a data read and write request to a setting data management unit 1210 via a setting value data access unit 1203 according to the instruction from the control unit 1201. An apparatus information obtaining unit 1204 obtains/changes the setting data by issuing the data read and write request to the setting data management unit 1210 via the setting value data access unit 1203 according to the instruction from the control unit 1201. Rotation processing of the setting value data corresponds to exchanging the setting data of the MFP 110 when rotating the MFP 110. The setting value data management unit 1210 stores the setting value data in the HDD 1109 and manages the data.

The management application 1200, the setting value data management unit 1210, and the communication unit 1220 correspond to the functions realized by the server 140 by the CPU 1101 executing the programs stored in one of the RAM 1102, the ROM 1103, the HDD 1109, and the FD 1111. In other words, the processes performed by each of the modules of the management application 1200, i.e., the control unit 1201, the rotation processing unit 1202, the setting value data access unit 1203, and the apparatus information obtaining unit 1204, the setting value data management unit 1210, and the communication unit 1220 are realized by control based on the programs executed by the CPU 1101.

Figure 13:
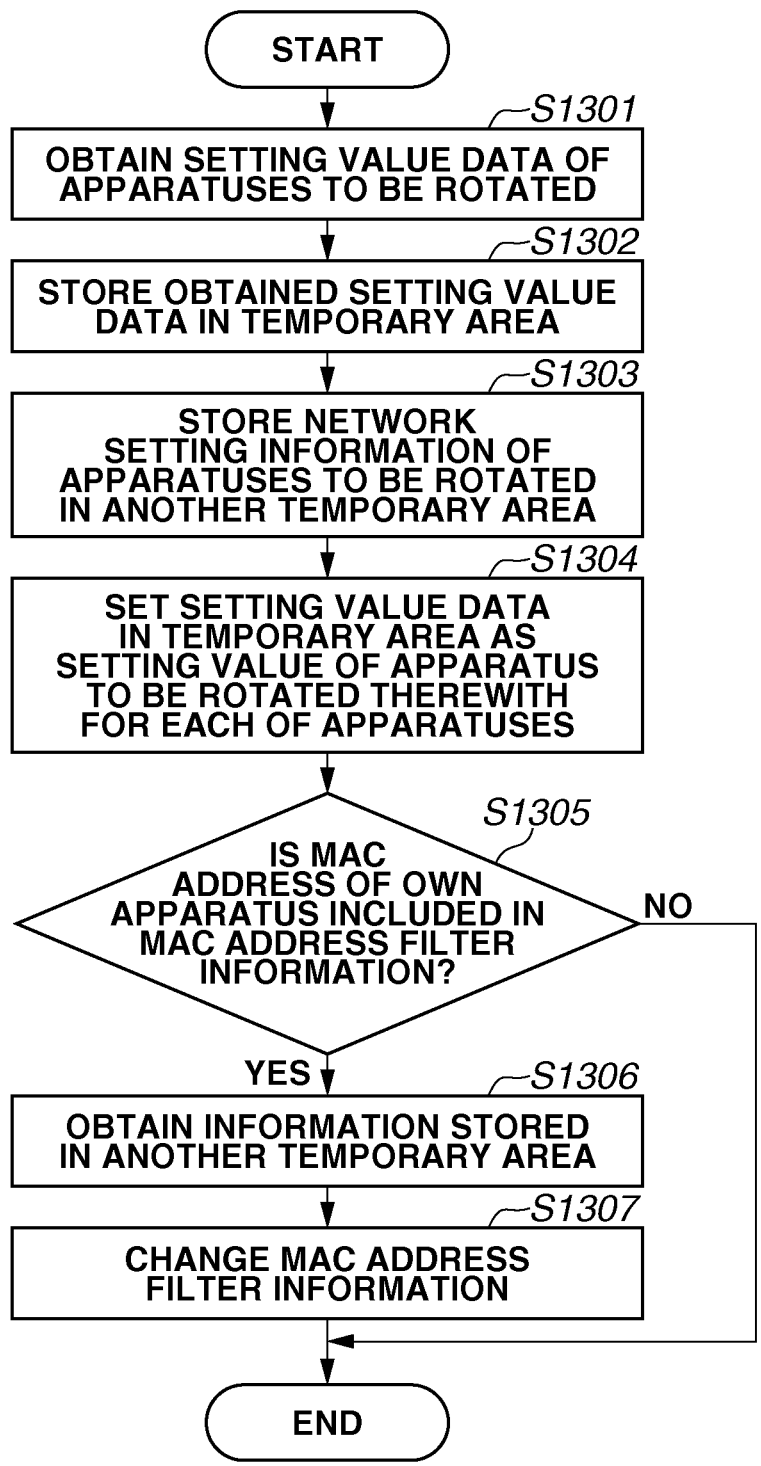
FIG. 13 is a flowchart illustrating an example of processing performed by the server according to the second exemplary embodiment.

FIG. 13 is a flowchart illustrating an example of processing performed by the server 140 according to the second exemplary embodiment. The processing corresponds to the processing of the management application 1200 executed by the CPU 1101, when rotation of the MFP 110 has been instructed, for generating the setting value data to be transferred to the MFP 110 after performing rotation. In other words, the server 140 realizes the processing illustrated in FIG. 13 by the CPU 1101 in the server 140 executing the program including the management application 1200 stored in the HDD 1109. S1301 through S1307 illustrated in FIG. 13 indicate each step of the processing.

Upon receiving an instruction from the communication unit 1220, the control unit 1201 in the management application 1200 determines whether the content of the processing request corresponding to the instruction received from the communication unit 1220 is a request to rotate the MFP 110. If the control unit 1201 determines that the received instruction is the request to rotate the MFP 110, the control unit 1201 starts the processing illustrated in FIG. 13.

The rotation request is issued to the communication unit 1220 as follows. The user operates on the operation screen displayed on a browser of the PC 120 as illustrated in FIG. 14, and the network I/F 1104 in the server 140 receives the request via the network 100.

Figure 14:
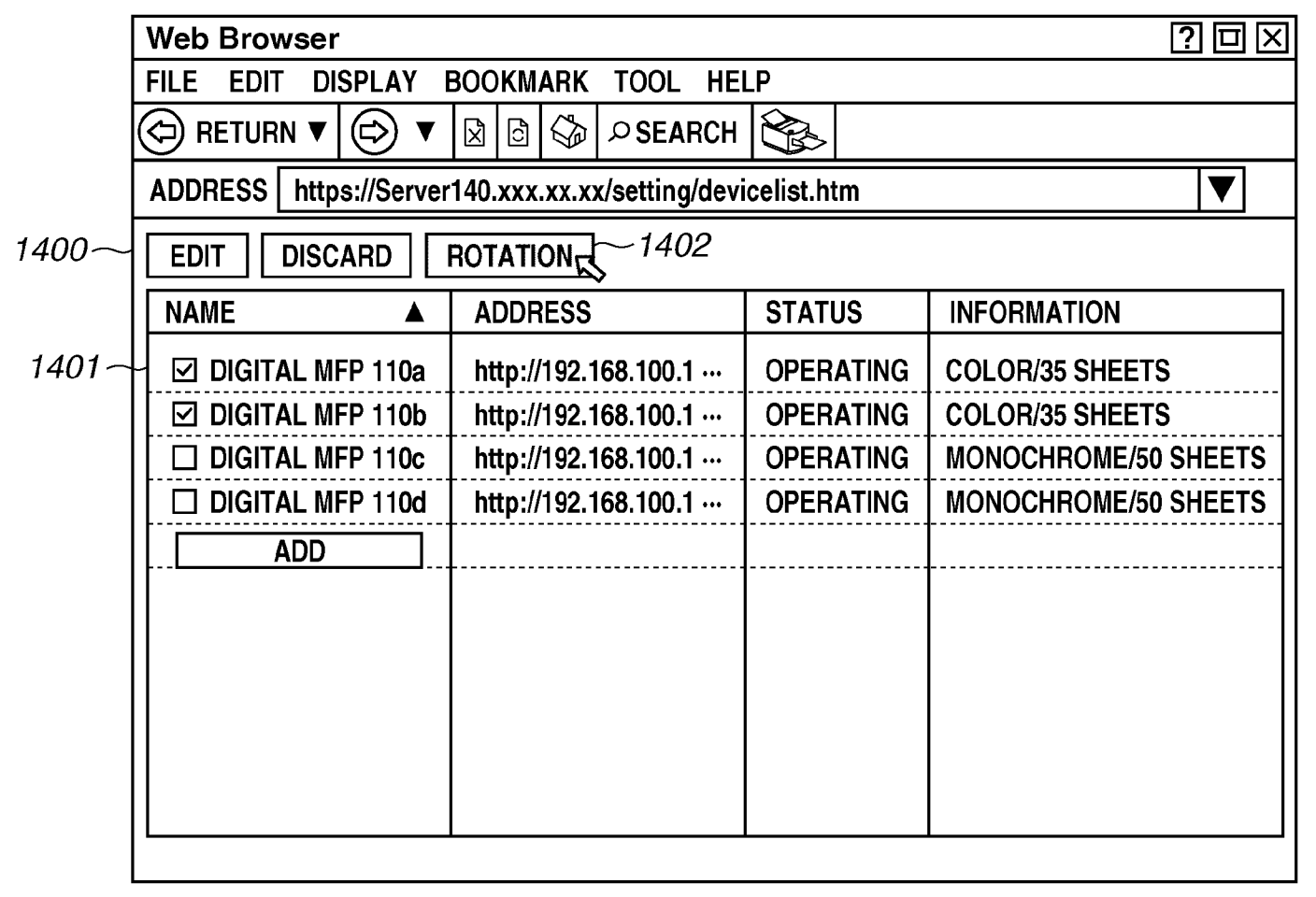

FIG. 14 illustrates an example of an operation screen 1400 for instructing rotation. The operation screen 1400 is generated on the server 140 according to the request received from a web browser of the PC 120, and transmitted to and displayed on the web browser.

Referring to FIG. 14, when the user requests rotation of the MFP 110*a* and the MFP 110*b*, the user selects the MFP 110*a* and the MFP 110*b* on the screen on which a list 1401 of the MFP 110 being managed is displayed. The user then presses a rotation button 1402, and requests the server 140 to rotate the MFP 110*a* and the MFP 110*b*. The communication unit 1220 in the server 140 receives the rotation request, and informs the control unit 1201 that the MFP 110*a* and the MFP 110*b* are to be rotated.

The flowchart illustrated in FIG. 13 will be described below. In step S1301, the control unit 1201 instructs the rotation processing unit 1202 that the MFP 110*a* and the MFP 110*b* are to be rotated. The rotation processing unit 1202 then issues a request to obtain the setting value data of the MFP 110*a* and the MFP 110*b* instructed to be rotated to the setting value data access unit 1203. The setting value data access unit 1203 obtains all of the necessary setting value data of the MFP 110*a* and the MFP 110*b* from the setting value data management unit 1210, and returns the obtained data to the rotation processing unit 1202.

In step S1302, the rotation processing unit 1202 stores the necessary setting value data obtained in step S1301 in a temporary area A of the HDD 1109 separately for each MFP to be rotated.

In step S1303, the rotation processing unit 1202 stores the network setting information of the MFP 110 for each MFP to be rotated in a temporary area B of the HDD 1109 which is different from the temporary area A in step S1302. The network setting information includes the MAC address.

In step S1304, the rotation processing unit 1202 obtains the setting value data of the MFP 110*a* stored in the temporary area A in step S1302. The rotation processing unit 1202 then issues a request to the setting value data access unit 1203 to set information of the obtained setting value data as the setting value data information of the MFP 110*b*. Further, the rotation processing unit 1202 obtains the setting value data of the MFP 110*b* stored in the temporary area A, and issues a request to the setting value data access unit 1203 to set information of the obtained setting value data as the setting value data information of the MFP 110*a*. The setting value data access unit 1203 issues a request to change the setting value data of the MFP 110*a* and the MFP 110*b* to the setting value data management unit 1210 according to the received request, and updates the setting value information of each MFP 110.

After performing the process of step S1304, the rotation processing unit 1202 performs the processes of step S1305 to step S1307 for each MFP to be rotated.

In step S1305, the rotation processing unit 1202 obtains the changed MAC address filter information of the MFP 110 being processed. Further, the rotation processing unit 1202 obtains the MAC address information of the MFP 110 being processed. The rotation processing unit 1202 then checks whether the MAC address information of the MFP 110 being processed is included in the changed MAC address filter information of the MFP 110 being processed.

If the rotation processing unit 1202 determines that the MAC address information of the MFP 110 being processed is not included in the changed MAC address filter information of the MFP 110 being processed (NO in step S1305), the processing being performed on the MFP 110 ends.

On the other hand, if the rotation processing unit 1202 determines that the MAC address information of the MFP 110 being processed is included in the changed MAC address filter information of the MFP 110 being processed (YES in step S1305), the processing proceeds to step S1306.

In step S1306, the rotation processing unit 1202 obtains the MAC address information of the rotation partner from the network setting information stored in the temporary area B in step S1303. In step S1307, the rotation processing unit 1202 uses the MAC address information obtained in step S1306 and edits the MAC address filter information of the MFP 110 being processed. More specifically, the rotation processing unit 1202 requests adding the MAC address information of the rotation partner obtained in step S1306 to the MAC address filter information being processed. Further, the rotation processing unit 1202 requests deleting the MAC address of the MFP 110 being processed from the MAC address filter information of the MFP 110 being processed. Upon receiving a notification that the requests have been completed from the setting value data access unit 1203, the rotation processing unit 1202 ends the processing being performed on the MFP 110. The rotation processing unit 1202 performs the processes of step S1305 to step S1307 for each MFP to be rotated.

A case where the user has instructed rotation of the MFP 110*a* and the MFP 110*b* with respect to the network setting illustrated in FIG. 6 will be described in detail below. In step S1303 of the flowchart illustrated in FIG. 13, the rotation processing unit 1202 stores the MAC address "12-34-56-78-90-AB" as the network setting information of the MFP 110*a* in the temporary area B. Further, the rotation processing unit 1202 stores the MAC address "56-78-90-AB-12-34" as the network setting information of the MFP 110*b*. In step S1304, the rotation processing unit 1202 changes the MAC address filter information of the MFP 110*a* to "34-12-56-78-90-BC" and "12-34-56-78-90-AB", and the MAC address filter information of the MFP 110*b* to "34-12-56-78-90-AB" and "56-78-90-AB-12-34".

In step S1305, since the MAC address of the MFP 110a "12-34-56-78-90-AB" is included in the updated MAC address filter information of the MFP 110a, the result of the determination becomes "YES". Similarly, since the MAC address of the MFP 110b is included in the MAC address filter information, the result of the determination becomes "YES". In step S1306, the rotation processing unit 1202 obtains the MAC addresses "12-34-56-78-90-AB" and "56-78-90-AB-12-34" of the MFP 110a and MFP 110b stored in the temporary area B in step S1303. In step S1307, the rotation processing unit 1202 deletes "12-34-56-78-90-AB" from the MAC address filter information of the MFP 110a and adds "56-78-90-AB-12-34" thereto. Similarly, the rotation processing unit 1202 deletes "56-78-90-AB-12-34" from the MAC address filter information of the MFP 110b and adds "12-34-56-78-90-AB" thereto.

By performing the above-described processing, the state illustrated in FIG. 9 is obtained similarly as the result obtained according to the first exemplary embodiment. The MAC address filter information can thus be set so that the MFP 110a and the MFP 110b are normally communicable after performing rotation.

As described above, if the setting value data of the MFP 110 is managed by the server 140, and the setting value data is exchanged for rotating the MFP 110, the setting value data can be automatically set without the administrator manually specifying the settings. Further, the server 140 collectively manages the setting value data, so that a medium such as the USB storage device which intermediates the data is unnecessary, unlike the first exemplary embodiment. The administrator can rotate the setting value data by only instructing on the management screen illustrated in FIG. 14, so that the MFP 110 can be easily rotated.

Further, according to the present exemplary embodiment, the MAC address filter information has been described as an example. However, the technique according to the present invention is not limited to the MAC address filter information, similarly as the first exemplary embodiment. For example, if the information processing apparatuses are to be rotated, the network filtering information can be automatically set by performing similar processing when exchanging the setting value data such as the general network filtering information including the MAC address filter information. For another example, the IP address filter information can be automatically set by performing similar processing on the IP address filter information in the environment where the IP address is a unique value for each MFP.

As described above, when the MFP are rotated in the environment where setting value data of the plurality of MFP is managed by the server, the network filtering information of a similar condition as the information set before performing rotation can be automatically set.

A third exemplary embodiment of the present invention is different from the first and second exemplary embodiments in that the setting value data of the MFP is exported and imported by performing peer-to-peer (P2P) communication between the MFP. The difference will be mainly described below.

FIG. 15 is a flowchart illustrating an example of processing for exchanging the setting value data according to the third exemplary embodiment. The processing corresponds to the processing of the management application 300 executed by the CPU 202, when the user instructs rotation of the MFP 110, for exchanging the setting value data with the MFP 110 to be rotated therewith. In other words, the MFP 110 realizes the processing illustrated in FIG. 15 by the CPU 202 in the MFP 110 executing the program including the management application 300 stored in the ROM 206 or the HDD 205. S401 through S403 and S1504 through S1510 illustrated in FIG. 15 indicate each step of the processing.

The processes for determining whether the rotation instruction has been received, and obtaining and storing the network setting information of the target apparatus, in a case where such instruction has been received, are similar to the processes of step S401 to step S403 in the flowchart of FIG. 4 according the first exemplary embodiment. Description will thus be omitted. Further, the process performed in a case where it is determined that the rotation instruction has not been received is also similar to the first exemplary embodiment, so that description will be omitted. A case where the processing is performed as an operation of the management application 300 in the MFP 110a when the MFP 110a and the MFP 110b are rotated will be described below.

After storing the network setting information in step S401 to step S403, the management application 300 performs the following processes in parallel. The management application 300 generates the export format data to be transmitted to the apparatus to be rotated therewith, and receives the data from the apparatus to be rotated therewith, to be described below.

The export format data is generated as follows. In step S1504, the control unit 302 instructs the export processing unit 304 to generate the export format data of the setting value data. Upon receiving an export instruction, the export processing unit 304 obtains the setting value data via the setting value data access unit 305. The export processing unit 304 then converts the obtained setting value data to the export format data, and generates the export format data.

In step S1505, the control unit 302 transmits via the network I/F 207 the data generated in step S1504 to the MFP 110b to be rotated therewith. In step S1506, the control unit 302 determines whether the transmission of the data is successful. If the control unit 302 determines that the transmission has failed (NO in step S1506), the control unit 302 cancels the processing including the process performed in parallel, and the processing ends. If the control unit 302 determines that the transmission is successful (YES in step S1506), the export format data generation process is completed, and the processing proceeds to step S1510 to be described below.

On the other hand, the process for receiving the data from the MFP 110b to be rotated therewith will be described below. In step S1507, the control unit 302 monitors whether the data has been received from the apparatus to be rotated therewith. If the control unit 302 detects that the data has been received (YES in step S1507), the processing proceeds to step S1508. In step S1508, the control unit 302 stores the received setting value data in the temporary area. Upon receiving all of the setting value data, in step S1509, the control unit 302 notifies the MFP 110b to be rotated therewith that the data reception has been completed, and ends the process for receiving the data.

In step S1510, the control unit 302 in the MFP 110 determines whether the MFP to be rotated therewith has successfully received the data, based on whether the reception completion notification has been successfully received from the MFP to be rotated therewith.

If the control unit 302 has received the reception completion notification from the MFP to be rotated therewith, the control unit 302 determines that the MFP to be rotated therewith has successfully received the data (YES in step S1510). In such a case, the control unit 302 waits for the data reception completion notification in step S1509, and ends the processing for exchanging the setting value data.

On the other hand, if the control unit 302 has not received the reception completion notification from the MFP to be rotated therewith, the control unit 302 determines that the MFP to be rotated therewith has failed to receive the data (NO in step S1510). In such a case, the control unit 302 cancels the processes including the process performed in parallel, and ends the processing.

According to the present exemplary embodiment, the processing for exchanging the setting value data is completed when both the export format data generation and the data reception from the apparatus to be rotated therewith are performed. However, it is not limited thereto, and control may be performed to proceed to the subsequent import processing according to a user instruction. As described above, control is performed to proceed to the import processing by waiting for a final confirmation by the user for changing the setting values such as the network setting. As a result, it reduces the possibility of a backward operation. Further, the instruction is not limited to the user instruction, and may be a different instruction such as an event by a timer or a sensor input.

Upon completing the setting value data exchange processing illustrated in FIG. 15, the management application 300 performs the processing for importing the setting value data. The processing of the management application 300 executed by the CPU 202 for performing the import processing using the setting value data that the MFP 110a has received from the MFP 110b will be described below with reference to the flowchart illustrated in FIG. 8.

In step S801, the control unit 302 reads the setting value data stored in the temporary area in step S1508 of the flowchart illustrated in FIG. 15, and instructs the import processing unit 303 to perform the import processing. Upon receiving an import instruction, the import processing unit 303 checks the validation of the data, analyzes the data, and identifies the data to be set for the setting value data management unit 310. The import processing unit 303 requests the setting value data management unit 310 via the setting value data access unit 305 to set the identified data, and performs the import processing. Upon completing the import processing, the import processing unit 303 returns the result to the control unit 302. The processes similar to those according to the first exemplary embodiment are performed in step S802 and the subsequent steps. The MAC address filter information is then correctly set and the import processing performed by the management application 300 thus ends.

As described above, when P2P communication is performed between the MFP so that the setting value data is exchanged and rotation is performed without employing the external storage device or the server, the data can be automatically set. It is thus unnecessary for the administrator to specify the settings. Further, if the setting value data for performing rotation is exchanged by P2P communication, the import processing may be performed after confirming that the export format data of both MFP has been correctly exchanged. As a result, it prevents inconsistency in which only the data of one of the MFP is changed.

Furthermore, according to the above-described exemplary embodiments, an example in which the setting value data is exchanged between two information processing apparatuses has been described. However, the present invention is applicable to the case where the setting value data is exchanged among three or more information processing apparatuses. An example in which the setting data is circularly exchanged among an apparatus A, an apparatus B, an apparatus C, ..., an apparatus Y, and an apparatus Z will be described below. In such a case, the setting data of the apparatus A is imported to the apparatus B, the setting data of the apparatus B to the apparatus C, ..., the setting data of the apparatus Y to the apparatus Z, and the setting data of the apparatus Z to the apparatus A. The present application is applicable to such an example. More specifically, in such a case, it is assumed that the network information obtained and stored in step S403 illustrated in FIG. 4 is the network setting information of the apparatus exporting the setting value data to be imported. In the above-described example, the apparatus A obtains and stores the network information of the apparatus Z in step S403.

Moreover, the present invention is applicable to the case where slave apparatuses are rotated in an environment including a plurality of pairs of apparatuses having a master and slave relation. In such a case, the information of the master apparatus is set for the slave apparatus, and the MAC address of the slave apparatus is set for the MAC address filter of the master apparatus. When the slave apparatuses are rotated, the network information (e.g., the MAC address) of the rotation partner is previously stored (in step S403 illustrated in FIG. 4), and the setting value data is exchanged. This is similar to the above-described exemplary embodiment. If the MAC address of the own apparatus is set in the MAC address filter after exchanging the setting value data, the MAC address of the own apparatus is deleted from the MAC address filter, and the stored MAC address is added. In such a case, it is assumed that each of the slave apparatuses to be rotated notifies the master apparatus before being rotated (i.e., before exchanging the setting value data) of the MAC address of the rotation partner which has been previously obtained and stored. The slave apparatus then requests editing of the MAC address filter of the master apparatus. Upon receiving such a request, the master apparatus deletes the MAC address of the slave apparatus which has issued the request from the MAC address filter thereof. The master apparatus then adds the MAC address notified from the slave apparatus.

Further, if the master apparatuses are to be rotated, each of the master apparatuses to be rotated notifies the slave apparatus before being rotated (i.e., before exchanging the setting value data) of the MAC address of the rotation partner. The master apparatus then requests editing of the master apparatus setting in the slave apparatus. Upon receiving such a request, the slave apparatus changes the master apparatus setting specified thereto to the master apparatus notified from the requesting master apparatus.

By performing the above-described processing, when rotation is performed between the slave apparatuses or the master apparatuses among the apparatuses having the master-slave relation, the following is realized. The slave apparatus and the master apparatus become capable of cooperating with each other similarly as before performing rotation, without the administrator manually changing the settings. According to the above-described processing, the MAC address filter information has been described as an example. However, the technique according to the present invention is not limited to the MAC address filter information. For example, if the information processing apparatuses are to be rotated, the network filtering information can be automatically set by performing similar processing when exchanging the setting value data including general network filtering information other than the MAC address filter information. More specifically, the IP address filter information can be automatically set by performing similar processing on the IP address filter information in the environment where the IP address is a unique value for each MFP.

Further, there may be an apparatus not having the master-slave relation which registers the network information of the information processing apparatus to be rotated therewith in the network filtering information. If the information processing apparatus to be rotated therewith recognizes the apparatus, the following may be performed. The apparatus is notified of the network information of the rotation partner and requested to register the network information in the network filtering information before performing rotation. The network information corresponds to the MAC address or the IP address. The network filtering information corresponds to the MAC address filter information or the IP address filter information.

As described above, according to the exemplary embodiments of the present invention, if the information processing apparatuses are to be rotated and used, and the network information of the other apparatus is set as the setting value data in each apparatus, the setting value data can be exchanged between the information processing apparatuses in consistency with each other. As a result, network communication can be performed between the apparatuses without the administrator manually setting the data after performing rotation.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-104794 filed May 17, 2013, which is hereby incorporated by reference herein in its entirety.

What is claimed is:

1. A first information processing apparatus comprising:
   an obtaining unit configured to obtain setting information set for another information processing apparatus;
   a changing unit configured to change, in a case where the obtained setting information includes an address of the first information processing apparatus, the address of the first information processing apparatus included in the obtained setting information to an address of the another information processing apparatus; and
   a setting unit configured to set the setting information changed by the changing unit as a setting of the first information processing apparatus.

2. The first information processing apparatus according to claim 1, wherein the setting information is filter information for permitting communication with a specific external apparatus.

3. The first information processing apparatus according to claim 1, further comprising a connecting unit configured to connect a storage device,
   wherein the obtaining unit obtains setting information set for the another information processing apparatus from the storage device.

4. The first information processing apparatus according to claim 3, wherein the obtaining unit obtains an address of the another information processing apparatus from the storage device, and
   wherein the changing unit changes the setting information using the address of the another information processing apparatus obtained from the storage device.

5. The first information processing apparatus according to claim 3, wherein the storage device is a universal serial bus (USB) memory.

6. A control method of a first information processing apparatus comprising:
   obtaining setting information set for another information processing apparatus;
   changing, in a case where the obtained setting information includes an address of the first information processing apparatus, the address of the first information processing apparatus included in the obtained setting information to an address of the another information processing apparatus; and
   setting the changed setting information as a setting of the first information processing apparatus.

7. A non-transitory storage medium storing a program for causing a computer to execute the control method of a first information processing apparatus according to claim 6.

* * * * *